United States Patent [19]
Hendrickson et al.
[11] Patent Number: 4,897,530
[45] Date of Patent: Jan. 30, 1990

[54] METER BASE DRIVE ASSEMBLY

[75] Inventors: Richard J. Hendrickson, Danville; Ward Payn, Pacheco, both of Calif.
[73] Assignee: f.m.e. Corporation, Hayward, Calif.

[21] Appl. No.: 305,149
[22] Filed: Feb. 1, 1989
[51] Int. Cl.[4] ........................... G06C 5/02; G06F 1/00
[52] U.S. Cl. ....................................... 235/101; 235/10; 101/92; 101/234; 242/58
[58] Field of Search .................... 235/10, 101; 101/92, 101/95, 233, 234, 292; 242/58

[56] References Cited

U.S. PATENT DOCUMENTS

| | | | |
|---|---|---|---|
| 3,556,001 | 1/1971 | Kinney | 235/101 X |
| 3,626,846 | 12/1971 | Wiegert | 101/234 X |
| 3,791,293 | 2/1974 | Rastorguyegg et al. | 101/234 |
| 4,658,122 | 4/1987 | Payn et al. | 235/101 |
| 4,763,823 | 8/1988 | Eden et al. | 242/58 X |

*Primary Examiner*—B. R. Fuller
*Attorney, Agent, or Firm*—Townsend and Townsend

[57] ABSTRACT

A meter base drive assembly (4) is a part of a postage meter base (2), to which a postage meter is mounted. The assembly includes envelope drive (62), a tape dispenser (86) and a print head drive (84) mounted to a base frame (12). The drive assembly includes a motor drive (6), pivotally mounted (10, 14) to the frame, which drive a pulley (8) in a first rotary direction. First, second and third driven pulleys (16, 18, 56) are operably coupled to the envelope drive, print head drive tape dispenser respectively. A dual pulley (20), including first and second ppulley element (28, 53), is pivotally mounted (34, 36; 102, 104) to the frame. One side (30) of a first drive belt (26) engages the drive pulley and the second driven pulley. The second side (32) of the first drive belt engages the first pulley element. A second drive belt (52) engages the second pulley element and the second driven pulley so that the first and second driven pulleys are rotated in opposite rotary directions.

17 Claims, 3 Drawing Sheets

METER BASE DRIVE ASSEMBLY

BACKGROUND OF THE INVENTION

Various types of metering products are in common use. The most common type is used to dispense postage by printing directly on an envelope or onto a tape which is adhered to the envelope or package. Metering products are also used by package delivery services to signify expenditure of money for the package delivered. Most metering products can be thought of as including three basic components: a meter, a meter base and a scale. The meter typically includes a rotatable print head and the necessary electrical and mechanical components which set the print wheels carried by the print head, rotate the print head for each impression and account for the postage or other shipping charges. One conventional postage meter is disclosed in U.S. Pat. No. 4,658,122 dated Apr. 14, 1987, entitled POSTAGE METER STEPPER MOTOR MODULE, the disclosure of which is incorporated by reference.

The meter itself is mounted to the meter base. The meter base provides the driving force for rotating the print head in the meter as well as providing the necessary structure for delivering letters past the print head during each print cycle. The scale may be mounted to the meter base or be a separate component from the meter base. The scale may be connected directly to the meter, which eliminates separate entry of postage amounts into the meter, or not, which requires the postage amounts to be separately entered.

SUMMARY OF THE INVENTION

The present invention is directed to a meter base drive assembly used with meter bases, such as a postage meter base, to which a postage meter or other type of meter is mounted. The meter base typically includes a base frame to which an envelope drive and a print head drive are mounted. The meter base may also include a tape dispenser as well.

The meter base drive assembly includes a motor drive, pivotally mounted to the base frame, which rotates a drive pulley in a first rotary direction. First, second and third driven pulleys are operably coupled to the envelope drive the print head drive and the tape dispenser respectively. A dual pulley, including first and second pulley elements mounted to a common shaft, is movably mounted to the frame. One side of a first drive belt engages the drive pulley and either of the first and second driven pulleys typically the first driven pulley. The second side of the first drive belt engages the first pulley element so that the first pulley element rotates in a direction opposite that of the drive pulley. A second drive belt engages the second pulley element and, typically, the second driven pulley so that the first and second driven pulleys are rotated in opposite rotary directions.

The design of metering products such as postage meters, is a complicated, time consuming and thus expensive job. One of the aspects of the invention is the recognition that by using a single basic meter base which can be relatively easily modified to accommodate various other components, such as different types of meters, tape drives, letter feeders and so forth, economies in design and production can be realized. To do so, the drive assembly carried by the meter base must be inherently flexible to accommodate different driven components and various arrangements of the components. With the present invention, this is accomplished in a reliable, accurate and yet flexible manner through the use of the drive assembly discussed above to provide positive, accurate drive. Flexibility is achieved since to change the various driving speeds or drive ratios one needs merely to change the size of the driving or driven pulleys, an easily accomplished procedure.

The motor drive, together with its associated drive pulley, are preferably pivotally mounted to the meter base frame to provide a clutched action in the event the load on the drive belt becomes too great. In addition to the override aspect of the pivotal mounting of the motor drive and drive pulley, the motor drive mounting platform can be spring biased to provide an adjustable tension on the first drive belt. The tensioning or loading of the first drive belt thus is a result of the weight of the motor drive, the torque exerted by the motor drive and the adjustable spring force on the mounting platform.

The drive belts are preferably toothed drive belts which positively drive the driven pulleys.

Other features and advantages will appear from the following description in which the preferred embodiments have been set forth in detail in conjunction with the accompanying drawings.

DETAILED DESCRIPTION OF THE PREFERRED EMBODIMENTS

Figure 1:
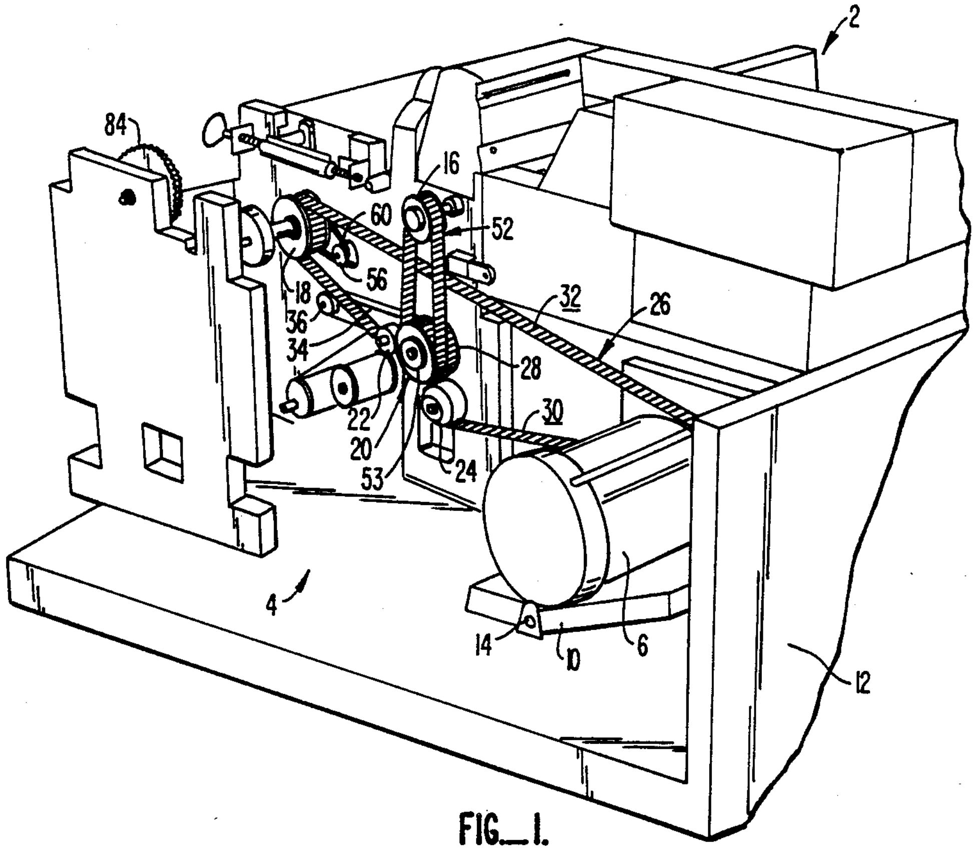
FIG. 1 is a partial perspective view of a meter base showing a meter base drive assembly made according to the invention.

Referring now to FIG. 1, a meter base 2 is shown with its rear cover removed to illustrate the configuration of a meter base drive assembly 4 made according to the invention. Assembly 4 is shown to include a motor drive 6 which drives a drive pulley 8 (see FIG. 2) both of which are supported by a mounting platform 10. Platform 10 is pivotally supported by the frame 12 of meter base 2 at a pivot axis 14.

Figure 3:
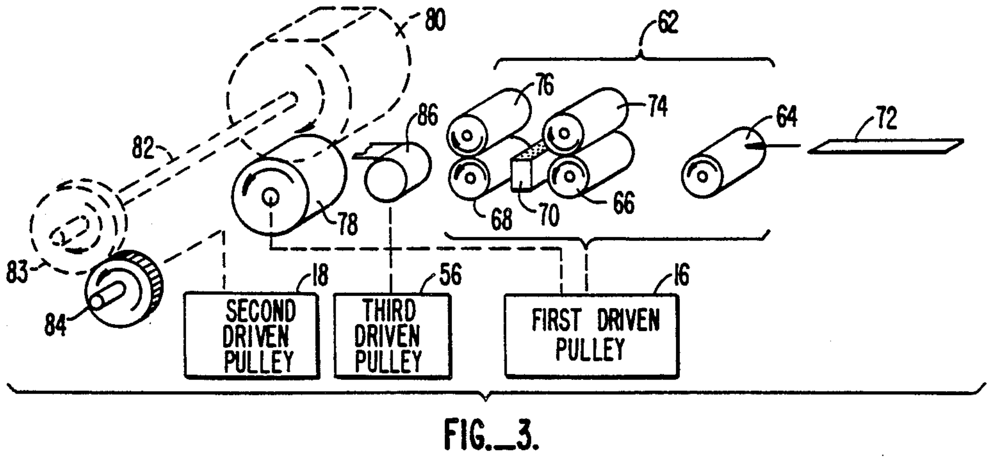
FIG. 3 simplified schematic representation of the main drive elements of a meter base shown coupled to the driven pulleys in conjunction with portions of a print head shown in dashed lines.

Drive assembly 4 also includes a number of pulleys and belts coupled to drive pulley 8 so to drive the various components of meter base 2, as will be discussed below with additional reference to FIG. 3. Assembly 4 includes a first driven pulley 16, a second driven pulley 18, a dual pulley and a pair of idler rollers 22, 24. A first, toothed drive belt 26 passes around drive pulley 8, second driven pulley 18 past idler roller 22, around a first pulley element 28 of dual pulley 20, past idler pulley 24 and back to drive pulley 8.

Drive belt 26 is a dual sided, toothed belt having a first side 30 which engages complementarily toothed drive and driven pulleys 8 and 18. Second side 32 is also toothed and engages complementarily configured first pulley element 28. Pulley 16, 18, 22, 24 are all at fixed positions relative to frame 12 of meter base 2. Dual pulley 20 is mounted to one end of a pivot mount bar 34 which is connected to frame 12 at pivot 36.

Tension is applied to first drive belt 26 in three ways. The weight of motor drive 6 pivots mounting platform 10 in the direction of arrow 38 (see FIG. 2); the reaction torque from motor drive 6 tends to pivot mounting platform 10 in the direction of arrow 38 as well. Finally, mounting platform 10 has an adjustable spring biasing force applied to it in the direction of arrow 38 by a tension adjuster 40. Tension adjuster 40 includes an adjustment screw 42 mounted to frame 12, and over which a spring 44 is mounted to press against mounting platform 10. The force of spring 44 on platform 10 is adjusted through an adjustment nut 46 to provide the user with a means for adjusting the tension on drive belt 26.

Figure 2:
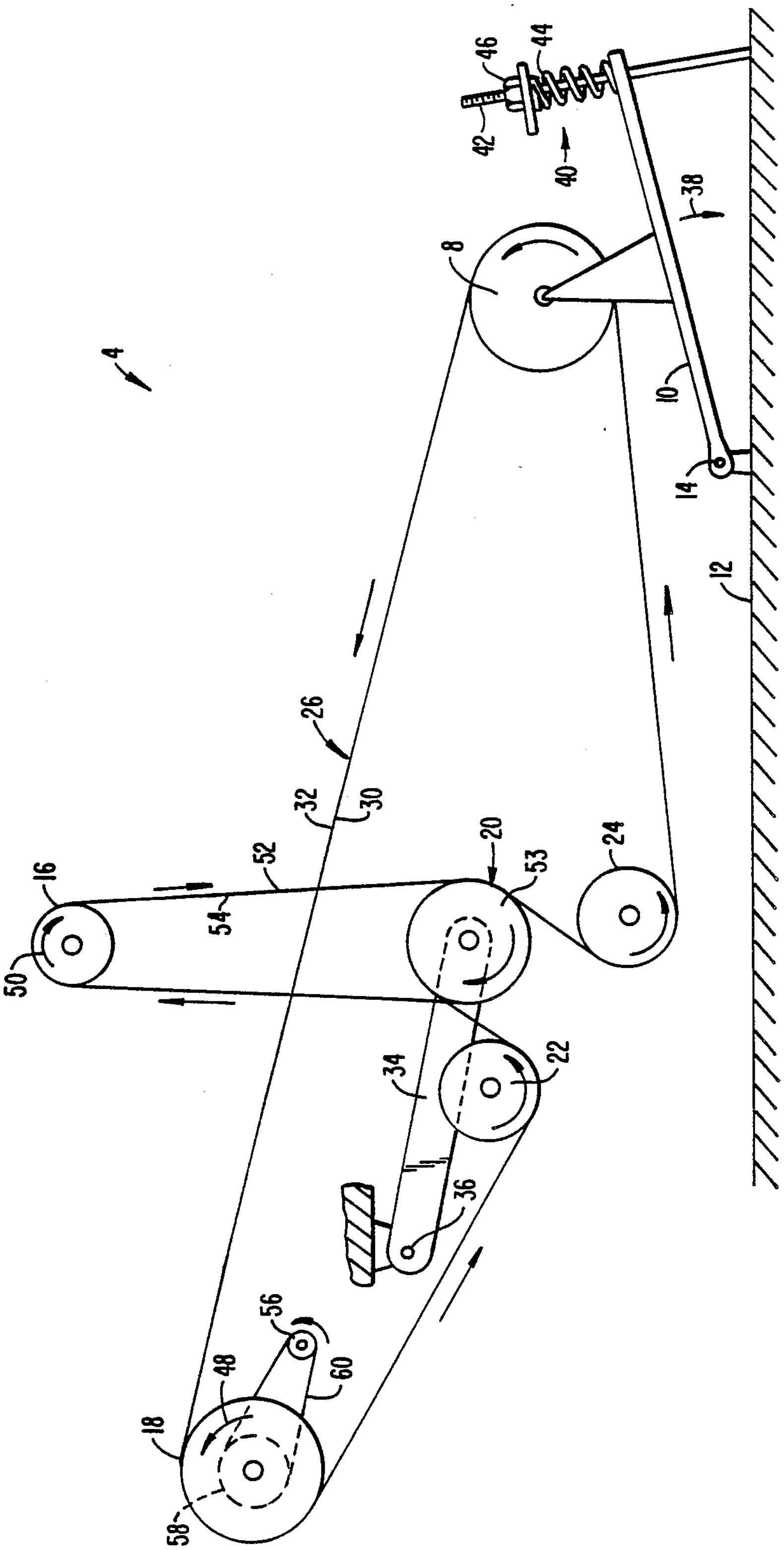
FIG. 2 is a schematic side view of the meter base drive assembly of FIG. 1.

While second driven pulley 18 is rotated in the direction of arrow 48, counterclockwise in FIG. 2, first pulley 16 is rotated in the direction of arrow 50, clockwise in FIG. 2, by a second, toothed drive belt 52 which passes around the first driven pulley 16 and a second pulley element 53 of dual pulley 20. This reverse rotation between first and second driven pulleys 16, 18 is achieved by driving second driven pulley 18 with first side 30 and first pulley element 28 of dual pulley 20 with second side 32. The tension on second drive belt 52, since dual pulley 20 is movably mounted to frame 12 is also determined by the biasing force applied to drive pulley 8.

A third driven pulley 56 is coupled to a supplemental pulley 58 mounted integrally with and coaxially to second driven pulley 18 through a drive belt 60.

The construction and operation of the various components driven by drive assembly 4 are conventional, are not a part of the invention and thus will not be described in detail. However, for a better understanding of the invention, various operating elements will be discussed in simplified form with reference to FIGS. 1 and 3. First driven pulley 16 is seen to be operably coupled to an envelope drive 62 and a pressure roller 78. Envelope drive 62 includes, typically, a bump feed roller 64 and a pair of drive rollers 66, 68 on either side of an envelope sealer 70. An envelope 72 is driven through meter base 2 first through the operation of bump feed roller 64 which letter 72 then passes between an idler roller 74 and drive roller 66, past envelope sealer 70 and between idler roller 76 and drive roller 68. The envelope then continues past pressure roller 78 where an impression is made by a rotating print head 80.

Print head 80 is driven by second driven pulley 18. Print head 80 is driven through the rotation of a print head drive shaft 82 and a print head drive gear 83. Gear 83 is driven by a meter drive gear 84 supported by frame 12. Note that print head 80, print head drive shaft 82 and print head drive gear, shown in phantom in FIG. 3, are part of a meter not shown, which is mounted to meter base 2. Other types of mechanical drive connections between meter base 2 and the meter, instead of the use of meter drive gear 84, can be used as well. Different drive configurations are relatively easily accommodated by simply modifying the meter drive components downstream of second driven pulley 18.

Third driven pulley 56 is coupled to and drives a tape dispenser 86, which dispenses tape segments when envelopes 72 are not being used for the impression.

Figure 4:
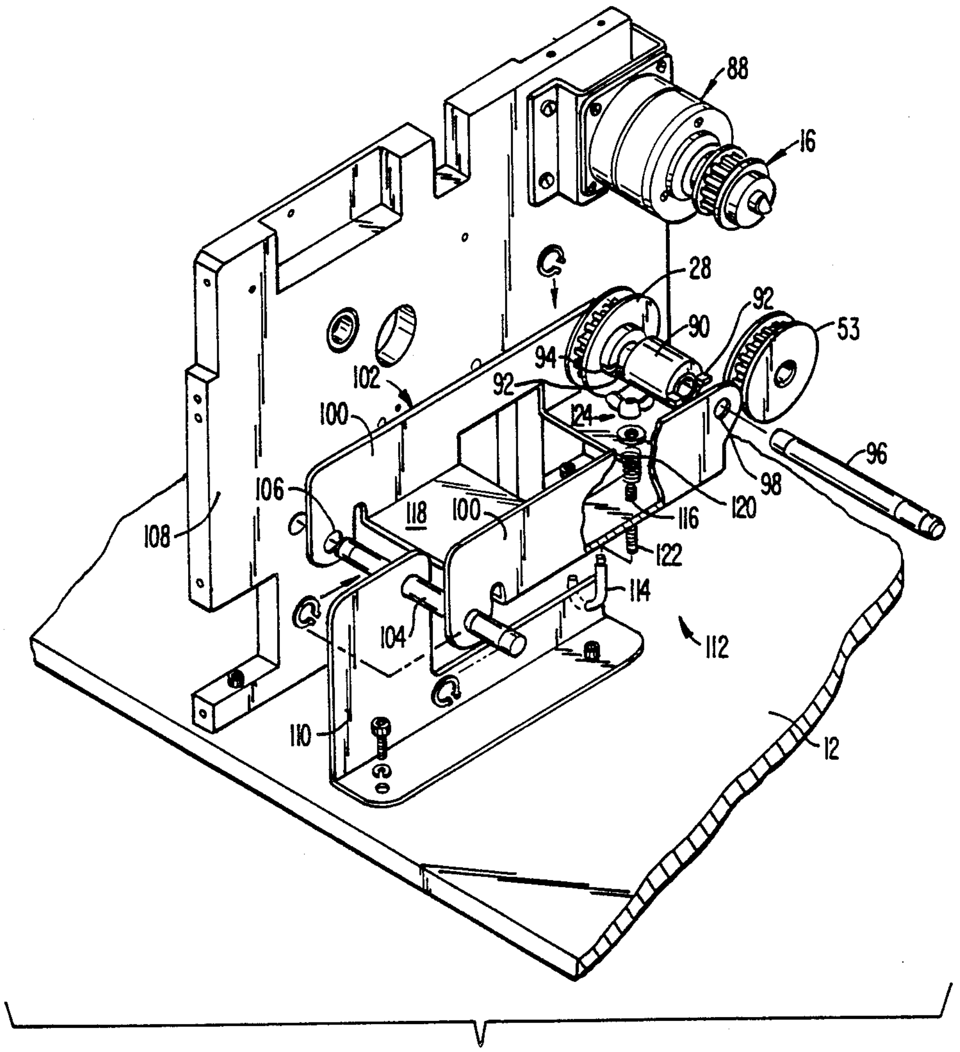
FIG. 4 is a partially exploded isometric view of a portion of an alternative embodiment of the meter base drive assembly of FIG. 2 in which the first and second pulley elements are positioned on a common shaft spaced apart from one another with the common shaft biased to provide a proper tension on the second drive belt.

In some situations it is desirable to isolate first driven pulley 16 from envelope drive 62 and pressure roller 78 through a clutch 88 as shown in FIG. 4. This requires that first and second pulley elements 28, 53 be spaced apart from one another. In the embodiment of FIG. 4 this is accomplished through a drive spacer 90 having lugs 92 which engage corresponding slots 94 formed in pulley elements 28, 53, the combination being mounted on a shaft 96. Shaft 96 passes through and is supported within openings 98 formed in the laterally upstanding legs 100 of a generally U-shaped pivot support 102. Support 102 is supported by a pivot shaft 104 which passes through openings 106 in legs 100 and corresponding openings formed in a bulkhead 108 and an L-shaped support bracket 110.

It is necessary to insure that sufficient tension is applied to second drive belt 52 to keep belt 26 from slipping. This is accomplished using a tension adjuster 112 including a J-bolt 114 hooked at its lower end to support bracket 110 and extending through a through hole 116 formed in the base 118 of U-shaped pivot support 102. Tension adjuster 112 includes a spring 120 which passes over threaded portion 122 of J-bolt 114 and is biased against base 118 by a nut and washer combination 124 mounted to threaded portion 122. Note that in the embodiment of FIG. 4 many of the elements shown in FIG. 1 are omitted for clarity.

In use, drive assembly 4 has the various pulleys sized to accommodate the desired drive ratios for the components of the meter base 2 and the postage meter used. The postage meter is mounted to meter base 2 and is driven through meter drive gear 84. Adjustment of the tension on drive belts 26, 52 is achieved through tension adjuster 40 while in the embodiment of FIG. 4 the tension on second drive belt 52 can be further adjusted through tension adjuster 112. Rotation of the first, second and third driven pulleys 16, 18, 56 drive their respective envelope drive 62/pressure roller 78, print head 80 and tape dispenser 86 at the correct speeds and in the proper rotary directions.

Modification and variation can be made to the disclosed embodiments without departing from the subject of the invention as defined in the following claims. For example, only first drive pulley 16 is driven in the opposite rotary direction as is drive pulley 8. If desired, more than one driven pulley could be so driven through the engagement of second side 32 of first drive belt 26.

What is claimed is:

1. A meter base drive assembly for use with meter bases having a frame, an envelope drive and a print head drive both mounted to the frame, the assembly comprising:

- a motor drive mounted to the frame;
- a drive pulley driven by the motor drive in a first rotary direction;
- a first driven pulley drivingly coupled to the envelope drive;
- a second driven pulley drivingly coupled to the print head drive;
- a dual pulley, including first and second pulley elements, mounted to the frame;
- a first drive belt engaging the drive pulley, the first pulley element of the dual pulley and a selected one of the first and second driven pulleys; and
- a second drive belt engaging the second pulley element and the other of the first and second driven pulleys so the first drive belt drives the second drive belt through the dual pulley.

2. The assembly of claim 1 wherein the drive pulley is mounted to and supported by the motor drive.

3. The assembly of claim 2 wherein the motor drive is pivotally mounted to the frame at a pivot axis, the pivot axis being spaced apart from the axis of the drive pulley, and further comprising means for biasing the motor drive and drive pulley therewith against the first drive belt.

4. The assembly of claim 3 wherein the biasing means includes an adjustable spring biasing mechanism.

5. The assembly of claim 1 wherein the first drive belt includes first and second sides, the first side engaging the drive pulley and the selected one of the first and second driven pulleys, the second side engaging the first pulley element of the dual pulley so that the drive pulley and the selected one of the first and second pulleys are driven in the first rotary direction while the dual pulley is rotated in the second rotary direction.

6. The assembly of claim 5 wherein the second drive belt includes third and fourth sides, the third side engaging the second pulley element and the other of the first and second driven pulley.

7. The assembly of claim 5 wherein the selected one of the first and second driven pulleys is the second driven pulley.

8. The assembly of claim 7 wherein the first drive belt is dual sided toothed belt and the drive pulley, the first pulley element of the dual pulley and the second driven pulley are toothed pulleys sized for mating engagement with the dual sided toothed drive belt.

9. The assembly of claim 8 wherein the third surface of the second drive belt is a toothed surface and the second pulley element and the first driven pulley are complementarily toothed for engagement with the toothed third surface.

10. The assembly of claim 1 further comprising means for movably mounting the dual pulley to the frame.

11. The assembly of claim 10 wherein the dual pulley includes a common shaft and the first and second pulley elements are axially spaced apart.

12. The assembly of claim 11 further comprising means for biasing the dual pulley away from the first drive pulley.

13. The assembly of claim 1 further comprising means for pivotally mounting the dual pulley to the frame.

14. The assembly of claim 1 wherein the dual pulley includes a common shaft and the first and second pulley elements are axially spaced apart.

15. A meter base drive assembly for use with postage meters and the like of the type including a meter base having a frame, an envelope drive mounted to the frame, a tape dispenser mounted to the frame and a print head drive mounted to the frame, the drive assembly comprising:

a motor drive having an output shaft;

a drive pulley mounted to the output shaft;

a first driven pulley drivingly coupled to the envelope drive;

a second driven pulley drivingly coupled to the print head drive and to the tape dispenser;

a dual pulley, mounted to the frame, including coaxial first and second pulley elements;

a first drive belt having a first side engaging the drive roller and one of the first and second driven pulleys, the first drive belt having a second side engaging the first pulley element; and a second drive belt having a third side engaging the second pulley element and the other of the first and second driven pulleys so that the first and second driven pulleys are rotated in opposite rotary directions.

16. The assembly of claim 15 wherein the first and second sides of the first drive belt, the drive pulley, the first driven pulley and the first pulley element all define toothed surfaces.

17. The assembly of claim 16 further comprising:

means for pivotally mounting the motor drive to the frame for pivotal movement about a pivot axis spaced apart from the output shaft; and means for biasing the drive pulley against the first drive belt to permit slippage between the drive pulley and the first drive belt when the first drive belt is subjected to an overload force.

* * * * *